(12) United States Patent
Tsubata

(10) Patent No.: US 7,512,517 B2
(45) Date of Patent: Mar. 31, 2009

(54) PEDOMETER

(75) Inventor: Keisuke Tsubata, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 11/900,436

(22) Filed: Sep. 12, 2007

(65) Prior Publication Data

US 2008/0077353 A1    Mar. 27, 2008

(30) Foreign Application Priority Data

Sep. 21, 2006    (JP) .............................. 2006-255444

(51) Int. Cl.
*G01C 22/00* (2006.01)
*G06F 15/00* (2006.01)
(52) U.S. Cl. ..................................... 702/160
(58) Field of Classification Search .................. 702/127, 702/160; 482/54; 377/24.2
See application file for complete search history.

(56) References Cited

U.S. PATENT DOCUMENTS 5,164,967 A * 11/1992 Endo et al. .................. 377/24.2

5,475,725 A * 12/1995 Nakamura .................. 377/24.2
2007/0202997 A1 * 8/2007 Tsubata ........................ 482/54

FOREIGN PATENT DOCUMENTS

| EP | 1612518 | 1/2006 |
|---|---|---|
| JP | 2518217 | 10/1989 |
| JP | 2004-101346 | 4/2004 |

* cited by examiner

*Primary Examiner*—Bryan Bui
(74) *Attorney, Agent, or Firm*—Adams & Wilks

(57) ABSTRACT

A detecting signal detected by a walking sensor carried by a person is amplified and outputted by a first amplifying circuit. When a detecting signal by way of only the first amplifying circuit from among the first and a second amplifying circuit is inputted to an input of a CPU, the CPU determines that the person is running, sets a mask time period or the like for running and carries out a processing of calculating a number of steps based on the detecting signal. When the detecting signal by way of only the first amplifying circuit is not inputted to the input of the CPU and a detecting signal by way of both the first and second amplifying circuits is inputted to an input of the CPU, the CPU determines that the person is walking, sets the mask time period or the like for walking and carries out the processing of calculating the number of steps based on the detecting signal.

10 Claims, 3 Drawing Sheets

IN WALKING  IN RUNNING

PEDOMETER

BACKGROUND OF THE INVENTION

1. Field of the Invention

The present invention relates to a pedometer for measuring a number of steps by detecting walking of a human body, and particularly relates to a pedometer having a function of measuring the number of steps in walking and in running.

2. Description of the Related Art

In a background art, there has been developed a pedometer capable of measuring a number of steps in walking and in running.

For example, according to a pedometer described in Publication of Japanese Utility Model Registration No. 2518217 (page 2, left column, line 50 through page 4, right column, line 43, FIG. 3 through FIG. 6), by selecting a kind of a moving motion (walking or running) measured by external inputting means, a measuring mode capable of measuring the number of steps in the corresponding moving operation (a walking measuring mode for measuring the number of steps in walking or a running measuring mode of measuring the number of steps in running) is set, and a filter characteristic of a filter and an amplification factor of an amplifier are switched in accordance with the set measuring mode.

However, at each time of measuring the number of steps, the measuring mode needs to be set by selecting the kind of the moving motion, and therefore, when different moving operations are carried out continuously as in a case of changing the moving motions continuously from walking to running, in the midst of measuring the number of steps, an operating button for changing the kind of the measured moving motion is forced to be operated.

Further, when a definition of the moving motion is ambiguous, there poses a problem that a person is at a loss by which of the modes is to be set and a way of use thereof is not excellent. Further, when the measuring mode is erroneously set, there poses a problem that the number of steps cannot be measured accurately.

An object of the present invention is to provide a pedometer that measures a number of steps highly accurately by dispensing with the operation of selecting a measuring mode when the number of steps is measured in walking and in running.

SUMMARY OF THE INVENTION

According to the invention, there is provided a pedometer comprising a sensor for detecting a moving motion of a measured person and outputting a detecting or detection signal (hereinafter referred to as detecting signal) in correspondence therewith, first amplifying means for amplifying to output the detecting signal from the sensor, filter means for passing the detecting signal of a signal from the first amplifying means, second amplifying means for amplifying to output a detecting signal from the filter means, and means for calculating a number of steps for calculating the number of steps based on the detecting signal by way of only the first amplifying means and a detecting signal by way of the first amplifying means and the second amplifying means in the detecting signals by way of the first amplifying means and the second amplifying means, wherein the means for calculating the number of steps calculates the number of steps based on the detecting signal by way of only the first amplifying means when the detecting signal by way of only the first amplifying means is provided, and calculates the number of steps based on the detecting signal by way of the second amplifying means when the detecting signal by way of only the first amplifying means is not provided and the detecting signal by way of the second amplifying means is provided.

The means for calculating the number of steps calculates the number of steps based on the detecting signal by way of only the first amplifying means when the detecting signal by way of only the first amplifying means is provided, and calculates the number of steps based on the detecting signal by way of the second amplifying means when the detecting signal by way of only the first amplifying means is not provided and the detecting signal by way of the second amplifying means is provided.

Here, there may be constructed a constitution in which the pedometer further comprises first binalyzing means for binalyzing the detecting signal from the first amplifying means and second binalyzing means for binalyzing the detecting signal from the second amplifying means, wherein the means for calculating the number of steps calculates the number of steps based on a detecting signal from the first binalyzing means when the detecting signal is provided from the first binalyzing means and calculates the number of steps based on a detecting signal from the second binalyzing means when the detecting signal from the first binalyzing means is not provided and the detecting signal is provided from the second binalyzing means.

Further, there may be constructed a constitution in which the filter means is constituted by setting a frequency characteristic thereof to shut off a signal of a predetermined frequency or higher, passes the detecting signal in walking and shuts off the detecting signal in running.

Further, there may be constructed a constitution in which the means for calculating the number of steps calculates the number of steps by changing an algorism for calculating the number of steps in accordance with whether the number of steps is calculated based on the detecting signal from either of the first amplifying means and the second amplifying means.

According to the invention, when the number of steps is measured in walking and in running, an operation of selecting the measuring mode is dispensed with, and the number of steps can be measured highly accurately by the pertinent measuring mode.

DESCRIPTION OF THE PREFERRED EMBODIMENTS

Figure 1:
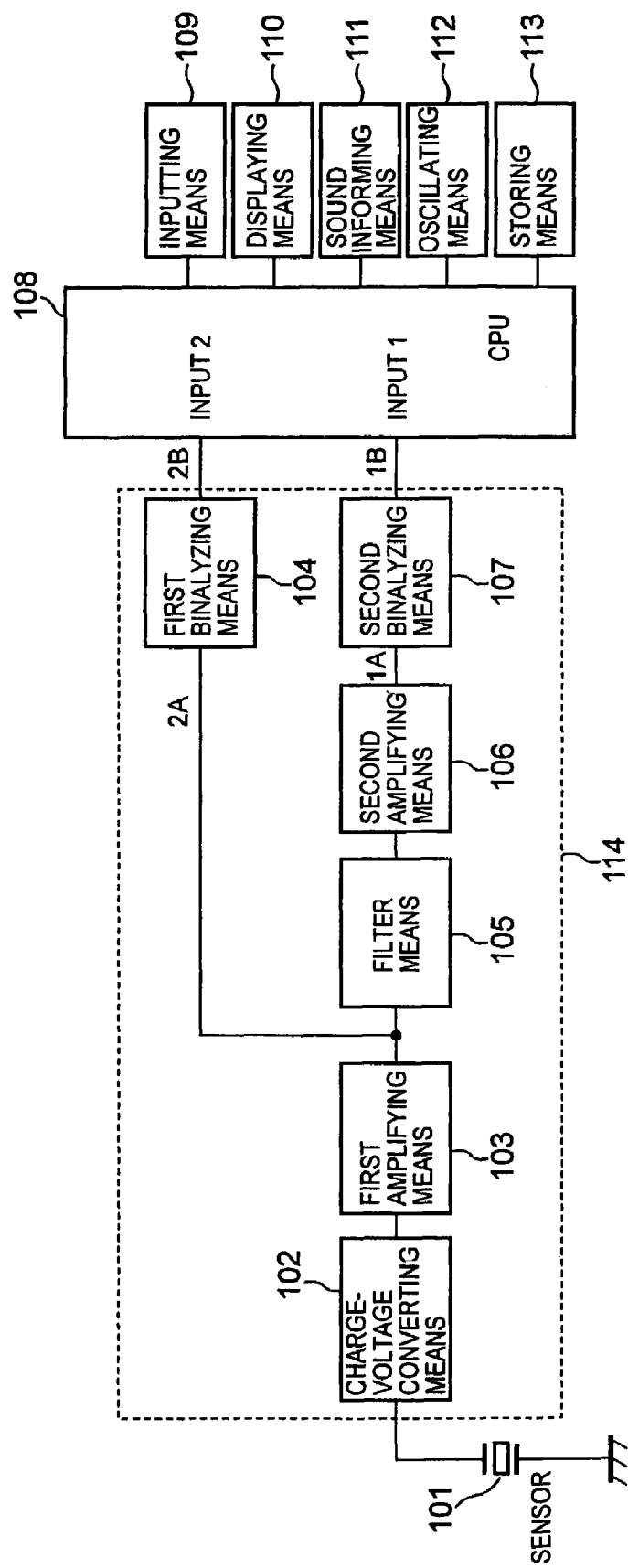
FIG. 1 is a block diagram of a pedometer according to an embodiment of the invention.

FIG. 1 is a block diagram of a pedometer according to an embodiment of the invention.

In FIG. 1, a pedometer includes a walk sensor (an acceleration sensor according to the embodiment) 101 for outputting a signal of detecting a corresponding charge at each time of detecting a moving motion of a measured person, charge-voltage converting means 102 for converting the detecting signal from the walk sensor 101 into a corresponding detecting signal of a voltage to output, first amplifying means 103 for amplifying to output the detecting signal from the charge-voltage converting means 102, and first binalyzing means 104 for converting the detecting signal in an analog signal style from the first amplifying means 103 into a detecting signal in a digital signal style to output.

Further, the pedometer includes filter means 105 for shutting off a signal having a predetermined frequency or higher of the signal from the first amplifying means 103, second amplifying means 106 for amplifying to output the detecting signal from the filter means 105, second binalyzing means 107 for converting the detecting signal in an analog signal style from the second amplifying means 106 into a detecting signal of a digital signal style, a central processing unit (CPU) 108 for carrying out a processing of calculating the number of steps based on the detecting signals from the first and the second binalyzing means 104, 107, inputting means 109 for carrying out various operations of an operation of starting to measure the number of steps constituted by an operation switch or the like, displaying means 110 for displaying the measured number of steps, a pitch or the like, sound informing means 111 for carrying out alarming or the like by sound, oscillating means 112 for generating a signal constituting a base of a reference clock signal for CPU 112 or a time signal in carrying out a time measuring operation, and storing means 113 for storing a program executed by CPU 108 and data of measured number of steps and the like.

CPU 108 includes two input terminals (input 1, input 2) for receiving the detecting signal and carries out a number of steps calculating processing based on the detecting signal inputted to the inputs 1, 2.

The filter means 105 is constituted such that a frequency characteristic thereof is set to shut off a signal of a predetermined frequency or higher to pass the detecting signal in walking and shut off the detecting signal in running.

For example, a pitch in walking is 90 through 120 steps/minute, a pitch in running is 170 through 190 steps/minute, in this case, the filter means 105 is constituted to pass the detecting signal having the pitch of 90 through 120 steps/minute but to shut off the detecting signal having the pitch equal to or larger than 170 steps/minute. The filter means 105 is constituted by a band pass filter, or a combination of a low pass filter and a high pass filter.

The first and the second binalyzing means 104, 107 are constituted by comparators, and constituted to output a signal having a signal level equal to or higher than a predetermined reference value as the detecting signal.

Further, the charge-voltage converting means 102, the first and the second amplifying means 103, 106, the first and the second binalyzing means 104, 107 and the filter means 105 constitute a detecting circuit 114. Further, CPU 108 constitutes controlling means for controlling the means of calculating the number of steps and respective constituent elements.

Figure 2:
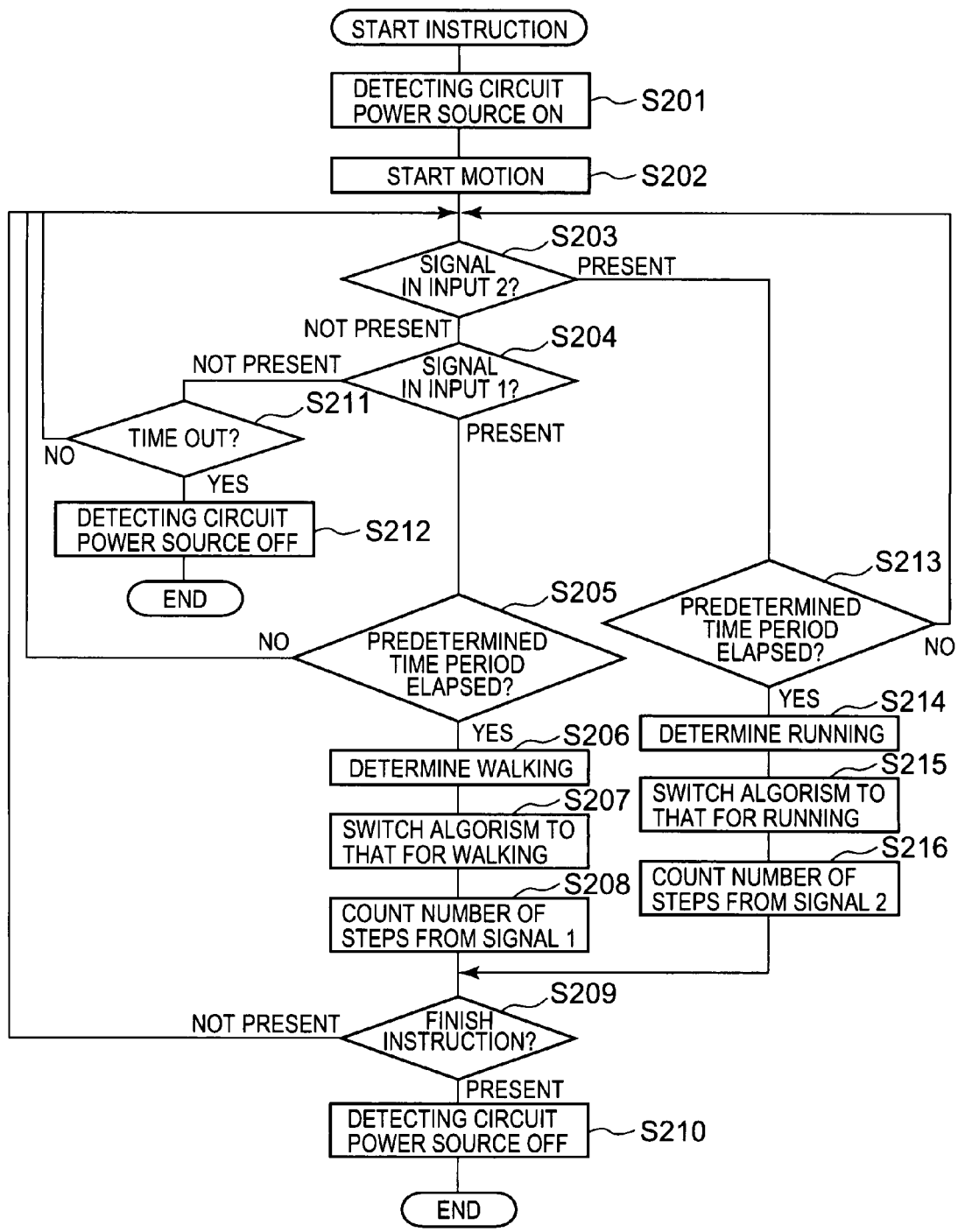
FIG. 2 is a flowchart showing a processing of a pedometer according to the embodiment of the invention.

FIG. 2 is a flowchart showing a processing of the pedometer of FIG. 1, mainly showing processings carried out by executing a program stored to the storing means 113 by CPU 108.

Figure 3A:
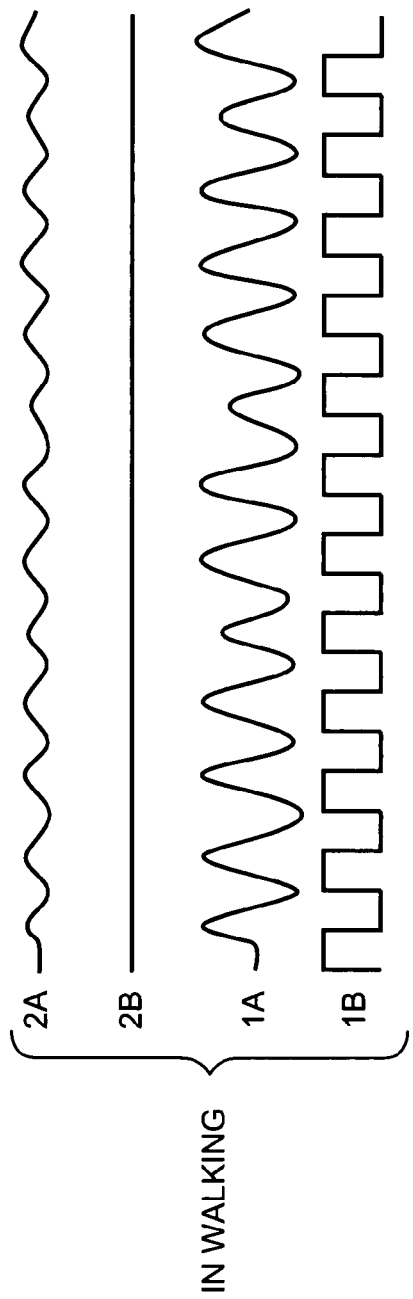
FIG. 3 illustrates timing charts of the pedometer according to the embodiment of the invention.
Figure 3B:
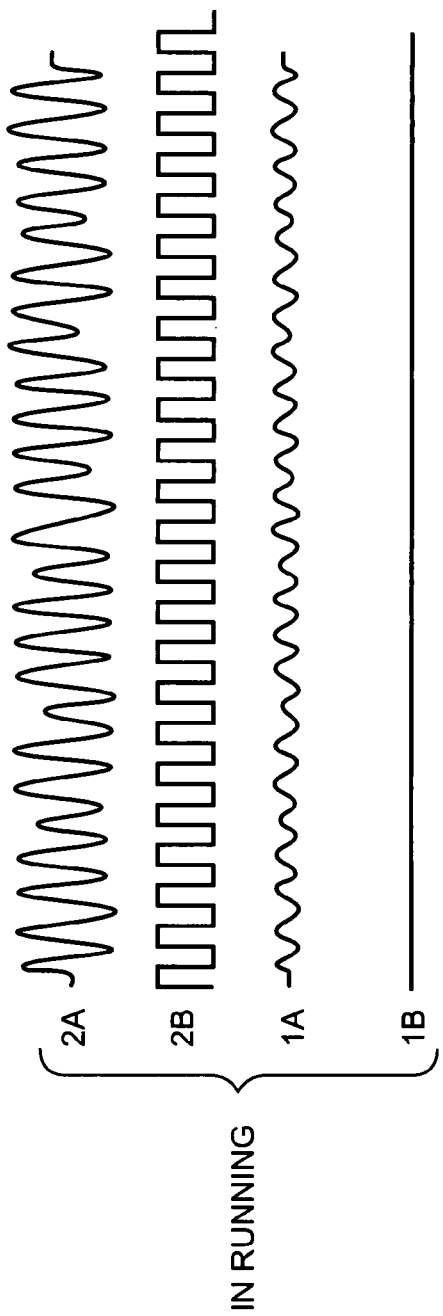

FIG. 3 illustrates timing charts of the pedometer according to the embodiment, FIG. 3A is a timing chart in walking, FIG. 3B is a timing chart in running. As shown by FIG. 3A, in walking, the detecting signal outputted from the walking sensor 101 is small, and therefore, the detecting signal 2A outputted from the first amplifying means 103 is at a low level and when the first binalyzing means 104 binalizes the detecting signal 2A by a predetermined reference value, the detecting signal of the digital signal style is not outputted from the first binalyzing means 104.

On the other hand, the detecting signal in walking is provided with a low frequency to be equal to or lower than the predetermined frequency, and therefore, the detecting signal 2A from the first amplifying means 103 is made to pass the filter means 105, amplified by the second amplifying means 106 and is inputted to the second binalyzing means 107 as the detecting signal 1A of a predetermined level or higher. The second binalyzing means 107 outputs the detecting signal 1A in the analog signal style to CPU 108 as a detecting signal 1B. At this occasion, the detecting signal 1B inputted to CPU 108 is the detecting signal in correspondence with walking.

As shown by FIG. 3B, in the case of running, the detecting signal outputted from the walking sensor 101 is large, and therefore, the detecting signal 2A outputted from the first amplifying means 103 is at a high level. When the first binalyzing means 104 binalizes the detecting signal 2A by a predetermined reference value, a detecting signal 2B in the digital signal style is outputted from the first binalyzing means 104 to CPU 108. At this occasion, the detecting signal 2B inputted to CPU 108 is the detecting signal in correspondence with running.

On the other hand, the detecting signal in running is provided with a high frequency to be equal to or higher than the predetermined frequency (a frequency shut off by the filter means 105), and therefore, the detecting signal 2A from the first amplifying means 103 is shut off by the filter means 105. Therefore, the detecting signal is not outputted from the second amplifying means 106 and the detecting signal is not outputted also from the second binalyzing means 107.

An operation of the pedometer according to the embodiment will be explained in details in reference to FIG. 1 through FIG. 3 as follows.

When the number of steps is to be measaured, the measured person mounts the pedometer on his or her arm, carries out a starting operation by the inputting means 109 and starts measuring a number of steps.

CPU 108 starts to measure by supplying a power source to the detecting circuit 114 in response to the starting operation of the inputting means 109 (step S201). Under the state, the measured person starts a motion to carry out a moving motion (step S202).

CPU 108 determines whether the detecting signal 2B is inputted to the input 2 from the first binalyzing means 104 by way of only the first amplifying means 103 (step S203), when it is determined that the detecting signal 2B is not inputted to the input 2, CPU 108 determines whether the detecting signal 1B is inputted to the input 1 from the second binalyzing means 107 by way of the first and the second amplifying means 103, 106 (step S204).

CPU 108 determines whether a predetermined time period has elapsed when it is determined that the detecting signal 1B is inputted to the input 1 (step S205), when it is determined that the predetermined time period has elapsed (that is, the detecting signal is generated and detected continuously for the predetermined time period), CPU 108 determines that the measured person is walking (step S206).

As described above, in walking, as shown by FIG. 3A, although the detecting signal 2B is not outputted from the first binalyzing means 104, the detecting signal 1B is outputted from the second binalyzing means 107.

When CPU 108 determines that the measured person is walking at a processing step S206, CPU 108 sets an algorism for calculating the number of steps of a processing of setting a time period of masking (mask time period) for preventing a detecting operation from being carried out during a predetermined time period between the detecting signals 1B contiguous to each other to an algorism for walking (step S207).

CPU 108 calculates the number of steps based on the detecting signal 1B inputted from the second binalyzing means 107 to the input 1, stores the calculated number of steps to the storing means 113 and displays the number of steps on the displaying means 110 (step S208).

Next, CPU 108 determines whether there is a finishing instruction from the inputting means 109 (step S209), when there is the finishing instruction, CPU 108 stops supplying the power source to the detecting circuit 114 (step S210) to finish the processing of measuring the number of steps.

When CPU 108 determines that the finishing instruction is not inputted at processing step S209, CPU 108 returns to processing step S203 to repeat the processing.

Further, when CPU 108 determines that the predetermined time period is not elapsed at processing step S205, CPU 108 returns to processing step S203 to repeat the processing similar to the above-described.

Further, when CPU 108 determines that the detecting signal 1B is not inputted to the input 1 at processing step S204, CPU 108 determines whether a predetermined time out time period has elapsed (step S211), when the time out time period has elapsed, CPU 108 stops supplying the power source to the detecting circuit 114 (step S212), finishes the processing of measuring the number of steps and when the time out time period has not been elapsed, CPU 108 returns to processing step S203 to repeat the processing.

On the other hand, when CPU 108 determines that the detecting signal 2B is inputted to the input 2 at processing step S203, CPU 108 determines whether a predetermined time period has elapsed (step S213).

When CPU 108 determines that the predetermined time period has elapsed at processing step S213, CPU 108 determines that the measured person is running (step S214).

As described above, in running, as shown by FIG. 3B, although the detecting signal 1B is not outputted from the second binalyzing means 107, the detecting signal 2B is outputted from the first binalyzing means 104.

When CPU 108 determines that the measured person is running at processing step S214, CPU 108 sets the algorism for calculating the number of steps of the processing of setting the time period of masking (mask time period) for preventing the detecting operation from being carried out during a time period between the detecting signal 2B contiguous to each other to an algorism for running (step S215).

CPU 108 calculates the number of steps based on the detecting signal 2B inputted from the first binalyzing means 104 to the input 2, stores the calculated number of steps to the storing means 113 and displays the number of steps on the displaying means 110 (step S216), thereafter, proceeds to processing step S209.

When CPU 108 determines that the predetermined time period has not elapsed at processing step S213, CPU 108 returns to processing step S203 to repeat the processing.

As described above, the pedometer according to the embodiment is constituted by paying attention to the fact that the frequency of the detecting signal in walking is the frequency lower than the frequency of the detecting signal in running, and the signal level of the detecting signal in walking is at the level lower than the signal level of the detecting signal in running.

That is, according to the pedometer of the illustrated embodiment, when the detecting signal 2B by way of only the first amplifying means 103 is inputted to the input 2 of CPU 108, CPU 108 automatically determines that the measured person is running, and carries out the processing of calculating the number of steps by setting a characteristic or a processing (algorism for calculating the number of steps) necessary for measuring the mask time period or the like to that for running.

On the other hand, when the detecting signal 2B by way of only the first amplifying means 103 is not inputted to the input 2 of CPU 108 but the detecting signal lB by way of both of the first amplifying means 103 and the second amplifying means 106 is inputted to the input 1 of CPU 108, CPU 108 automatically determines that the measured person is walking, and is constituted to carry out the processing of calculating the number of steps by setting a characteristic or a processing (an algorism for calculating the number of steps) necessary for measuring the mask time period or the like to that for walking.

Therefore, when the number of steps is measured in walking and in running, it is not necessary to operate to select the measuring mode manually but the measuring mode is set to a pertinent measuring mode automatically, and therefore, the number of steps can be measured highly accurately. Further, the manual mode setting is dispensed with, and therefore, an effect of capable of using the pedometer simply is achieved.

Further, although according to the embodiment, an explanation has been given by taking an example of the pedometer of a wristwatch type used by being mounted to the arm of the measured person, the embodiment is applicable to various kinds of pedometers of a pedometer of a style of being used in being mounted to the waist, a pedometer of a style of being used in a state of being contained to be held by a bag or the like, a pedometer incorporating a time piece function and the like.

The invention is applicable to various kinds of pedometers of a pedometer of a style of being used by being mounted to the arm, a pedometer of a style of being used by being mounted to the waist, a pedometer of a style of being used in a state of being contained to be held by a bag or the like, a pedometer incorporating a time piece function and the like.

What is claimed is:

1. A pedometer comprising:
a sensor for detecting a moving motion of a person and outputting a detecting signal in correspondence therewith;
first amplifying means for amplifying the detecting signal from the sensor;
filter means for passing the detecting signal from the first amplifying means;
second amplifying means for amplifying the detecting signal from the filter means;
first binalyzing means for binalyzing the detecting signal from the first amplifying means and second binalyzing means for binalyzing the detecting signal from the second amplifying means; and
means for calculating a number of steps based on the detecting signal by way of only the first amplifying means and a detecting signal by way of the first amplifying means and the second amplifying means in the detecting signals by way of the first amplifying means and the second amplifying means;
wherein the means for calculating the number of steps calculates the number of steps based on the detecting signal by way of only the first amplifying means when the detecting signal by way of only the first amplifying means is provided, and calculates the number of steps based on the detecting signal by way of the second amplifying means when the detecting signal by way of only the first amplifying means is not provided and the detecting signal by way of the second amplifying means is provided; and
wherein the means for calculating the number of steps calculates the number of steps based on a detecting signal from the first binalyzing means when the detecting signal is provided from the first binalyzing means and calculates the number of steps based on a detecting signal from the second binalyzing means when the detecting signal from the first binalyzing means is not provided and the detecting signal is provided from the second binalyzing means.

2. A pedometer according to claim 1; wherein the filter means is constituted by setting a frequency characteristic thereof to shut off a signal of a predetermined frequency or higher, passes the detecting signal in walking and shuts off the detecting signal in running.

3. A pedometer according to claim 1; wherein the means for calculating the number of steps calculates the number of steps by changing an algorism for calculating the number of steps in accordance with whether the number of steps is calculated based on the detecting signal from either of the first amplifying means and the second amplifying means.

4. A pedometer according to claim 2; wherein the means for calculating the number of steps calculates the number of steps by changing an algorism for calculating the number of steps in accordance with whether the number of steps is calculated based on the detecting signal from either of the first amplifying means and the second amplifying means.

5. A pedometer that measures the number of steps taken by a person in walking and in running, the pedometer comprising:
 a sensor that detects a moving motion of a person and outputs an analog detection signal in correspondence with the motion;
 first amplifying means for amplifying the analog detection signal;
 first binalyzing means for binalyzing the amplified analog detection signal from the first amplifying means when the amplified analog detection signal has a signal level equal to or higher than a predetermined reference value and outputting a corresponding digital detection signal indicative of a running motion of the person;
 a filter that passes the amplified analog detection signal from the first amplifying means when the analog detection signal has a frequency lower than a predetermined frequency indicative of a walking motion of the person and that blocks the analog detection signal when it has a frequency equal to or higher than the predetermined frequency;
 second amplifying means for amplifying the analog detection signal that passes through the filter;
 second binalyzing means for binalyzing the amplified analog detection signal from the second amplifying means and outputting a corresponding digital detection signal indicative of a walking motion; and
 calculating means automatically operative in response to the digital detection signals output from the first and second binalyzing means for calculating a number of steps of the person in running based on the digital detection signal output from the first binalyzing means and for calculating a number of steps of the person in walking based on the digital detection signal output from the second binalyzing means.

6. A pedometer according to claim 5; wherein the calculating means calculates the number of steps by changing on algorism for calculating the number of steps in accordance with whether the number of steps is calculated based on the digital detection signal output from the first binalyzing means or the second binalyzing means.

7. A pedometer according to claim 6; wherein the calculating means comprises a central processing unit.

8. A pedometer according to claim 6; wherein the calculating means comprises a central processing unit having one input connected to receive the digital detection signal output from the first binalyzing means and another input connected to receive the digital detection signal output from the second binalyzing means.

9. A pedometer according to claim 5; wherein the calculating means comprises a central processing unit.

10. A pedometer according to claim 5; wherein the calculating means comprises a central processing unit having one input connected to receive the digital detection signal output from the first binalyzing means and another input connected to receive the digital detection signal output from the second binalyzing means.

* * * * *